(12) United States Patent
Tonellot et al.

(10) Patent No.: US 8,255,166 B2
(45) Date of Patent: Aug. 28, 2012

(54) METHOD OF JOINT INVERSION OF SEISMIC DATA REPRESENTED ON DIFFERENT TIME SCALES

(75) Inventors: Thierry Tonellot, Montferrier sur Lez (FR); Marie-Lise Bernard, Ivry-sur-Seine (FR); Vincent Clochard, Sartrouville (FR)

(73) Assignee: IFP, Cedex (FR)

( * ) Notice: Subject to any disclaimer, the term of this patent is extended or adjusted under 35 U.S.C. 154(b) by 509 days.

(21) Appl. No.: 12/495,872

(22) Filed: Jul. 1, 2009

(65) Prior Publication Data

US 2010/0004870 A1    Jan. 7, 2010

(30) Foreign Application Priority Data

Jul. 3, 2008    (FR) ...................................... 08 03769

(51) Int. Cl.
*G01V 1/48* (2006.01)
(52) U.S. Cl. .......................................................... 702/16
(58) Field of Classification Search .................. 702/6, 7, 702/11, 13, 14, 16–18; 367/53, 73, 131
See application file for complete search history.

(56) References Cited

U.S. PATENT DOCUMENTS

| | | | |
|---|---|---|---|
| 2005/0075791 A1* | 4/2005 | Lailly et al. ..................... | 702/17 |
| 2006/0023569 A1* | 2/2006 | Agullo et al. ................... | 367/73 |

FOREIGN PATENT DOCUMENTS

EP    1 624 321 A1    2/2006

OTHER PUBLICATIONS

Sampei, M., et al: "Anti-windup Control for MIMO System Using Timescale Transform", Control Applications, 2006 IEEE, International Conference on, IEEE, PI, Oct. 1, 2006, pp. 2613-2618, XP031011600.

* cited by examiner

*Primary Examiner* — Mohamed Charioui
(74) *Attorney, Agent, or Firm* — Antonelli, Terry, Stout & Kraus, LLP.

(57) ABSTRACT

The invention is a method of constructing an image representative of a heterogeneous medium by a procedure of joint inversion of seismic data represented on different time scales having an application for underground reservoir exploration. Sequential inversion of the seismic data is performed so as to determine a first model from the seismic data expressed in a first time scale, and a second model from the seismic data expressed in the second time scale. A scale factor $t_1(t_0)$ allowing synthetic data described in a first time scale to be expressed in a second time scale is defined by a differential equation relating the traveltime variations of a seismic wave to the models resulting from the sequential inversion. Finally, joint inversion wherein a cost function using the scale factor is minimized is carried out so as to evaluate a difference between the synthetic data and the seismic data expressed in another time scale.

15 Claims, 4 Drawing Sheets

METHOD OF JOINT INVERSION OF SEISMIC DATA REPRESENTED ON DIFFERENT TIME SCALES

BACKGROUND OF THE INVENTION

1. Field of the Invention

The invention relates to geophysics and notably to petroleum exploration using seismic methods.

In particular, the invention relates to a seismic data stratigraphic inversion method for obtaining images representative of a heterogeneous medium such as the subsoil to, for example, allow characterization of hydrocarbon reservoirs.

2. Description of the Prior Art

Seismic exploration methods produce disturbances in the subsoil (emission of seismic waves in the subsoil by a seismic source) and in observing at the surface the waves reflected on the interfaces between the various geological layers of the earth, referred to as formations (such as sandstone, sand, shale layers), or refracted along some of these interfaces. Each time the seismic waves encounter a geological interface, part of the waves are reflected and travel up to the surface where it can be detected and recorded by a seismic wave pickups. Particular devices allow multi-offset records of these waves to be obtained which is the principle of reflection surveys. The reflections linked with the emission of two types of waves are generally considered which are compression waves referred to as P waves and shear waves referred to as S waves.

The geological interfaces located during seismic surveys are the surfaces of separation of media of different elastic impedances. Elastic impedance generalizes the notion of acoustic impedance, acoustic impedance being by definition the product of the density of a rock by the rate of propagation of the P waves in the rock.

By nature, a seismic survey provides the position of the reflectors in two-way traveltime for reaching them and coming back. In order to know their real depth position (in meters for example), the rate of propagation of the waves has to be known to estimate time-depth conversion laws. Depth restitution allows direct comparison of the seismic traces. The definition of a reliable velocity field with existing techniques however remains a very delicate operation (especially in heterogeneous media) and record section interpretation is in most cases achieved in the time domain.

The main characteristics of reflected waves are linked, on the one hand, with the elastic impedance contrasts between the geological layers and, on the other hand, with the rates of propagation of the waves in the medium. Now, all these parameters depend on the nature and on the fluid filling degree of the subsoil. Producing a hydrocarbon reservoir therefore affects the propagation of the seismic waves in the rock. In the seismic records, this is translated into:

variations in the recorded amplitudes of the seismic waves that have travelled through the reservoir. These variations are linked with the elastic impedance changes in the reservoir;

time shifts in the recording of some seismic events associated with the same seismic reflector in depth also called misalignment of the events). These shifts can be more or less significant and they are linked with changes (or differences) in the propagation velocity field of the elastic waves being considered.

Recording reflected waves thus allows indirectly knowing the nature of the geological layers travelled through and possibly to monitor the evolution of their properties.

A known seismic data analysis method is stratigraphic inversion. Stratigraphic inversion is, in general terms, a technique allowing estimation of a model described by one or more parameters from indirect data. In general, this technique is used when it is not possible to directly measure the parameters. This technique implies that it is known how to solve the problem of predicting the data when the parameters of the model are known (modelling stage allowing obtaining of data referred to as synthetic data). This is for example the case within the context of petroleum exploration where geological and petrophysical data characterizing a three-dimensional reservoir are sought, but where only seismic data can be generally measured on a large scale. In this context, the goal of the invention is to determine parameters, such as the impedances relative to the P and S waves and/or the density, from seismic data obtained from waves emitted in the medium by a seismic source. These waves are propagated in the subsoil and reflected on the discontinuities of the medium. They are recorded by pickups coupled with the underground formation and collected by an acquisition device.

Advanced seismic exploration methods require analysis of several seismic data sets expressed on different time bases. These data are, for example:

data resulting from repeated seismic surveys, referred to as "4D seismic surveys", carried out within the context of studies on the evolution of the distribution of fluids present in the subsoil, in a form of one or more reservoirs. These reservoirs can contain hydrocarbons, fluids of natural origin (natural gas, underwater, etc.), fluids deliberately injected into the ground (for $CO_2$ or natural gas storage, or to improve the recovery rates in producing wells, etc.). The 4D seismic surveys are increasingly used in oil reservoirs after starting production. In this technology, (3D or 2D) seismic measurement is either repeated in the same place at different times or continuously measured by means of permanent pickups arranged at the surface or in wells. Comparison of the data recorded then allows monitoring the evolution over time of these reservoirs, generally hydrocarbon reservoirs, by mapping the movements of the fluids linked with production to optimize the development schemes for existing fields and new fields. Using repeated seismic measurements can also contribute to improving static subsoil models, notably in reservoir zones that are not affected by production thanks to the measurement redundancy;

multi-component seismic data acquired within the context of a seismic (2D or 3D) exploration survey. Joint interpretation of different types of measured seismic data allows improving characterization of the reservoirs or, more generally, of the subsoil. Multi-component seismic surveys involve measuring several types of waves reflected at the same time. It is in fact possible to measure, in addition to the PP waves corresponding to successive reflections of an incident P wave as a P wave, the PS waves corresponding to the incident P waves reflected as S waves. More generally, in the case of a seismic source that can generate S shear waves, it is also possible to record SS waves corresponding to successive reflections of an incident S wave as an S wave, and SP waves corresponding to the incident S waves reflected as P waves. In a case of high anisotropy due to the presence of faults in the reservoir or above it (referred to as overburden), splitting of the S waves into a fast S wave (along the fault lines) and a slow S wave (orthogonal to the fault lines) can be observed. Then SV and SH waves are discussed. Using the S waves can therefore be a good way to evaluate the relative anisotropy of the medium. Furthermore, the combination of P and S waves allows better detection of anomalies linked with the fluids because S waves are insensitive to the presence of fluids.

An important problem in the analysis of several data sets appears when these data sets are expressed in different time scales, which is the case with data obtained from repeated seismic surveys or multi-component seismic surveys. For example, within the context of multi-component seismic surveys (or surveys using converted waves), the problem is to be able to take into account the propagation time differences between the different types of waves reaching the receivers, many combinations being possible (PP, PS, SP, SS waves, etc.).

Thus, because of the time shifts (of 4D origin or linked with differences in the type of wave considered within the context of multi-component seismic surveys) that can complicate their interpretation, it is important to have specific tools allowing analysis of sets of seismic data expressed in different time scales.

In the sphere of 4D seismic surveys, a conventional method of analyzing 4D seismic records measures directly the amplitude differences between the seismic traces of the various available data sets. Interpretation is then often backed up by modelling the elastic behavior of the subsoil according to the assumed changes in the physical properties thereof. An example of this approach can be found in EP Patent Application 1,865,340, or in the following document:

Johnston, D. H., Eastwood, J. E., Shyeh, J. J., Vauthrin, R., Khan, M., and Stanley, L. R., 2000, "Using Legacy Seismic Data in an Integrated Time Lapse Study: Lena Field, Gulf of Mexico", The Leading Edge, 19, no. 3, 294-302., p 294.

Interpretation of data based on amplitude differences can however be sometimes difficult. In fact, the variations over time of the physical properties of geological formations at the reservoir level (linked with the production of the reservoir, the use of enhanced recovery methods, etc.) modify the amplitude of seismic waves, but they also introduce time shifts in the seismic records (trace lengthening or shortening). The characteristic differences of two seismic traces can therefore be difficult to interpret since they result from amplitude changes as well as time shifts that can hide these amplitude variations.

Another approach uses statistical (or deterministic) pattern recognition techniques to split the seismic events into several groups, referred to as seismic facies, corresponding to the various lithologies and to the various physical states in the reservoir (construction of seismic facies maps). These classification type approaches are for example described in EP Patent 1,253,443 and in EP Patent Application 1,452,889. In some cases, the seismic records of each seismic survey are preprocessed via stratigraphic inversion, which allows construction of more readily interpretable seismic attributes such as the velocity of the impedance of elastic waves. These methods require using well data to establish statistical relations between the seismic attributes and characteristic parameters of the reservoir such as lithology, porosity, fluid filling degree, etc. The use of discriminant analysis techniques allows classification to be refined.

The drawback of these methods is that they are rather qualitative. They allow detection of the zones that have undergone changes, but quantitative estimation of the intensity of these changes remains difficult.

Other methods try to indirectly estimate the variations of physical properties in the reservoir in the form of seismic attribute variations obtained by means of seismic data stratigraphic inversion techniques. Stratigraphic inversion calculates seismic attribute models characteristic of the subsoil, such as the impedances and the density (generally in a reservoir-centered window) from the amplitudes of the seismic data, after or before stacking. By taking into account, in the inversion process, the available well data and physical constraints on the parameters that are sought (described as a priori information), stratigraphic inversion can provide reliable quantitative values for these seismic attributes, while improving the signal-to-noise ratio and the resolution of the models constructed.

A non-linear correlation algorithm for aligning two adjacent seismic traces is also known from Matson, Douglas G., and Hopper, J. R., 1992, "Nonlinear Seismic Trace Interpolation", Geophysics, 57, no. 1, p. 136-145. It allows to determine a scale factor which thereafter allows re-interpolation of seismic traces while preserving the dip and amplitude changes of each seismic reflector, under certain hypotheses.

This method has been adapted for 4D records which is described as cross-correlation. It has a sliding window corresponding to input signal $s_1(t)$ by a quantity $\delta t$ along the abscissa axis (time axis, t) and in seeking the time shift ($\delta t$) allowing the two signals to be superposed with a minimum difference. It is thus a criterion of a "resemblance" of the signals emitted and received, which, as can be sensed, gives results that are better since the distorsion is low.

To solve the problem of alignment of two seismic traces, there is another known technique based on a non-linear global optimization method coming from genetics. It is the Needleman-Wunsch (NW) algorithm, which is initially a method allowing alignment of amino-acid sequences in proteins.

Finally, there is a known method of analyzing several data sets by joint inversion of the seismic data sets, wherein a method of matching seismic data expressed in different time scales is used. Such a method is described in EP Patent 1,624,321 and in Agullo, Y., Macé, D., Labat, K., Tonellot, T., Bourgeois, A., and Lavielle, M., 2004, "Joint PP and PS Stratigraphic Inversion for Prestack Time Migrated Multicomponent Data", 74th Annual International Meeting, SEG, Expanded Abstracts, 889-892. The chosen approach is based on the calculation of a scale factor with the sole objective of minimizing the dissimilarity between calculated impedance models each using separate types of data. In particular, this method hides the fact that this scale factor, depending on the ratio of the velocities of the P waves and the S waves, cannot have any value.

In general terms, the prior methods calculate scale factors that appear as free parameters and, in particular, do not respect the laws of physics. This can lead to physically impossible models.

The invention is a method of analyzing several seismic data sets expressed in different time scales, by joint stratigraphic inversion. The method comprises using a technique of matching the seismic events linked with the same interface or structure in depth, by a scale factor constrained by physical laws, so as to construct images representative of an underground reservoir which are physically plausible. The method thus allows reliable characterizing of the underground reservoirs.

SUMMARY OF THE INVENTION

The invention is a method of constructing an image representative of a heterogeneous medium, by a procedure of joint inversion of seismic data expressed in different first and second time scales $t_0$ and $t_1$. It comprises the following stages: carrying out sequential inversion of the seismic data to determine a first estimation of at least one combination of physical quantities from the seismic data expressed in the first time scale, and at least a second estimation of the combination from the seismic data expressed in the second time scale; defining a scale factor $t_1(t_0)$ allowing synthetic data described in the first time scale $t_0$ to be expressed in the second time scale $t_1$, by a differential equation relating, by a function F, the traveltime variations of a seismic wave $$\frac{\partial t_1(t_0)}{\partial t_0}$$

to the combinations of physical quantities, and by determining scale factor $t_1(t_0)$ by solving the differential equation by a minimization method wherein the difference between $$\frac{\partial t_1(t_0)}{\partial t_0}$$

and the function F is minimized; and constructing the image representative of a heterogeneous medium by carrying out the joint inversion wherein a cost function using the scale factor $t_1(t_0)$ is minimized, so as to evaluate a difference between the synthetic data in the first time scale and the seismic data expressed in the second time scale.

According to the invention, the data expressed in the first and second different time scales can be data resulting from the emission of waves in the medium, such as elastic or electromagnetic waves.

These seismic data can be prestack multi-component seismic data.

According to the invention, one of the first and second time scales represents the scale of the arrival times of non-converted P waves (PP), or that of the arrival times of converted P waves (PS), or that of the arrival times of non-converted S waves (SS), or that of the arrival times of converted S waves (SP).

The combination of physical quantities can represent impedances, such as impedances relative to S waves, and the combinations of physical quantities can then be estimated using a mono-component inversion.

Finally, according to the invention, the inversion can be a stratigraphic inversion comprising using a priori information involving in-situ measured data.

DETAILED DESCRIPTION OF THE INVENTION

In rocks, velocity and density are physical parameters depending on the static (porosity, clay content, etc.) and dynamic (fluid content, pressure, temperature, relative permeability, etc.) properties thereof. It follows therefrom that, if these properties change in the subsoil over time, the elastic impedance contrasts in the medium can change, as well as the characteristics of the seismic signals (amplitudes, two-way traveltime of the waves, etc.) measurable at the surface.

Seismic measurements are thus conventionally used to obtain information on the characteristics of the subsoil formations: lithology, geometry, petrophysical properties, fluid saturations, pressure in the reservoir, etc. Although the vertical frequency resolution of these seismic data is lower than that of well data, they afford the advantage of providing larger-scale lateral information on the characteristics of the explored subsoil. Seismic surveys allow exploring large volumes of the subsoil and have the advantage, in relation to other sources of information, of providing a homogeneous point of view on the entire reservoir.

In particular, within the context of hydrocarbon reservoir monitoring during production phase, it has become common to repeat the recording of seismic measurements and to try to interpret the possible variations observed (in these seismic signals) in terms of variation of the reservoir properties such as fluid saturation or pressure.

For example, within the context of natural gas storage in an unconsolidated sandy reservoir embanked in clay, the velocity of the P waves and the density decrease when the natural water present in the soil is replaced by gas. These velocity and density variations induce an acoustic impedance decrease in the reservoir, which is translated into an increase in amplitude (bright spot) of the seismic reflections associated with the reservoir interfaces (clays-gas-sands) [Domenico, 1977].

The velocity decrease in the reservoir also induces an increase in the propagation time (time delays) of the waves associated with the reflections on the various interfaces below the reservoir, therefore of the arrival times of the seismic events that can be measured at the surface. If there is no change in the properties of the formations above and below the reservoir zone, the time shift cumulated during the propagation of each wave has to be zero above the reservoir and remain constant below the reservoir.

The method is described in the particular context of monitoring of a petroleum reservoir under production, by means of seismic surveys repeated over time and of records of PP type reflected waves. However, the method can also be applied in many other fields such as, for example, improvement of the characterization of reservoir by means of multi-component seismic techniques.

We have at least two sets of seismic data PP, acquired at different calendar dates, D0 and D1, but the same geometry and the same acquisition parameters (optimized acquisition and preprocessing for a 4D survey) are kept.

The first acquisition, which serves as the reference, is referred to as "base", and the second acquisition is referred to as "monitor". The seismic data used are prestack seismic data of AVA (Amplitude Variation with Angle of incidence) type, that is preprocessed by conventional seismic imaging techniques allowing time-migrated collections to be constituted and classified according to the angle of reflection. Analysis of these data that contain information on the amplitude variations of the waves reflected at the various subsoil interfaces, according to the incidence angle classes being considered, allows monitoring of the evolution of the reflectivities, that is to evaluate the variations of the elastic parameters in the reservoir. It is assumed that, if specific matching preprocessing has been performed, by cross-correlation for example, to globally improve the alignment of the seismic events, notably above the reservoir (static corrections), these preprocessing operations have not affected the time shifts due to the local velocity variations in the reservoir.

Using prestack data allows obtaining subsoil multi-parameter elastic models. The medium is described by means of three parameters: the impedances of the elastic P and S waves (denoted by $I_P$ and $I_S$) and the density (denoted by $\rho$). Two models are required to describe the subsoil at dates D0 and D1, denoted by $(I_P, I_S, \rho)^{base}$ and $(I_P, I_S, \rho)^{monitor}$ respectively because, between the two acquisition dates, the dynamic properties of the reservoir, such as fluid saturation or pressure, may have changed and therefore influenced $I_P$, $I_S$, $\rho$.

According to the invention, the method mainly comprises three stages:

Stage 1 corresponds to the sequential inversion of each set of seismic data PP available, in order to estimate the optimum subsoil model at $(I_P, I_S, \rho)$ expressed in the time base specific to the data set considered: $t_{D0}{}^{PP}$ or $t_{D1}{}^{PP}$;

stage 2 estimates a transformation law, of $t_{D1}{}^{PP}(t_{D0}{}^{PP})$ type for example, allowing matching trace to trace the data estimated on the two different time scales relative to dates D0 and D1. It is based on the implementation of a new method of aligning seismic events linked with the same reflector in depth (but recorded on different time bases) wherein a physical relation relating the impedance variations P (estimated from the sequential inversion results of stage 1) to the traveltime variations of the P waves in the medium is taken into account. In fact, the impedance being equal to the product of the velocity and of the density, the velocity variations and therefore the wave traveltime variations in the medium can be linked with the impedance and density variations;

stage 3 is the joint inversion proper of the data sets matched in stage 2. It allows simultaneous inversion of the "base" and "monitor" data to construct two subsoil models that can have different characteristics in some zones, notably in the reservoir assumed to be affected by the production, and identical in other zones that are a priori not affected by production (zones above the reservoir for example). This stage of joint inversion of the data sets matched in stage 2 extends the methods of stratigraphic inversion of prestack AVA-AVO seismic data of the following type:

mono-component described in French Patent 2,800,473 corresponding to U.S. Pat. No. 6,522,973;

multi-component described in EP Patent 1,624,321.

Applying simultaneous inversion of the two seismic surveys considered, at dates D0 and D1, has the advantage of allowing imposition that the subsoil models at $(I_P, I_S, \rho)$ are invariant in the zones not affected by production and of better eliminating 4D seismic noise (information that is not or weakly correlated between surveys). In fact, because of the non-unicity of models $(I_P, I_S, \rho)$ calculated via stratigraphic inversion, the differences observed between the models relative to dates D0 and D1 and obtained from inversions achieved separately may not result only from the effects of production (change in the dynamic properties such as fluid saturation), even after taking into account the traveltime differences (events alignment).

The three stages of the method are described in detail hereafter.

1—Estimation of a Preliminary Reservoir Model $I_P$, $I_S$, $\rho$) for Each Data Set The first stage separately estimates two 3D (or 2D) models denoted by $(I_P, I_S, \rho)_{D0}$ and $(I_P, I_S, \rho)_{D1}$ expressed in PP time describing the medium studied at times D0 and D1.

It is possible to obtain these estimations from the monocomponent stratigraphic inversion methodology described in French Patent 2,800,473 corresponding to U.S. Pat. No. 6,522,973. This method allows construction of 2D or 3D optimized models representative of a heterogeneous medium such as the subsoil, described by at least one or more parameter(s) or physical quantity (quantities), from recorded data corresponding to waves reflected by the medium and picked up by receivers coupled with the medium, in response to waves transmitted therein by a source, and a priori information including in-situ measured data.

Description of this methodology is carried out by modelling such that the synthetic data are the result of the convolution of the reflection coefficients by an optimum wavelet estimated for each incidence angle range being considered and for each acquisition date. The methodology however remains the same whatever the modelling selected. The wavelets are obtained using a well-to-seismic calibration methodology, described in French Patent 2,800,473 corresponding to U.S. Pat. No. 6,522,973.

More precisely, in this method, for each observed PP data set, stratigraphic inversion allows construction of an optimum model that minimizes the following cost function:

$$S^{PP}(m^{PP}) = \sum_\theta \|R_\theta^{PP}(m^{PP}) * W_\theta^{PP} - D_\theta^{PP}\|^2_{(C_d^{PP})^{-1}} + \|m^{PP} - m_{prior}^{PP}\|^2_{(C_m^{PP})^{-1}}$$

$m^{PP}$ is the current model representative of the subsoil domain being studied. It is described by the three parameters $I_P$, $I_S$, $\rho$, and it is expressed in Pp time; exponent PP indicates that the model is estimated only from the inversion of reflection data of PP type.

$R_\theta^{PP}$ is the reflectivity distribution in the subsurface corresponding to the current model, for a given incidence angle $\theta$. It is conventionally obtained using the Zoeppritz formulation or one of its approximations such as the Aki-Richards approximation.

$W_\theta$ designates the wavelet associated with angle $\theta$ and with PP data, previously estimated using for example a well-to-seismic calibration technique.

$D_\theta^{PP}$ designates the seismic data set AVA relative to the PP reflections, recorded and expressed in PP time.

The quantity $m_{prior}^{PP}$ designates the a priori model constructed by interpolation of the values of $I_P$, $I_S$, $\rho$ available in the wells and taking into account the known geological information (deposition modes, positions of seismic markers, etc.).

The first term of this cost function measures the difference between the synthetic data corresponding to the current model $m^{PP}$ and the observed data, in the sense of the inverse of the covariance matrix $C_d^{PP}$. The second term of this cost function measures the difference between the current model and the a priori model $m_{prior}^{PP}$ in the sense of the inverse of the covariance matrix $m_{prior}^{PP}$. These covariance operators describe the uncertainties on the PP data and on the PP a priori model respectively. Construction of the a priori model and of the covariance matrices also uses the characteristics given in French Patent 2,800,473. The prestack stratigraphic inversion algorithm implies the definition of uncertainties on the multi-parameter a priori model. These uncertainties can be taken into account in the inversion by means of a multi-parameter exponential covariance operator, which requires defining the variance of the uncertainties on each parameter of the a priori model, as well as the correlation length of these uncertainties. This correlation length allows fixing the confidence in the geometry of the a priori model.

2—Estimation of a Transformation Law

Stage 2 estimates a transformation law allowing matching seismic attribute cubes, resulting from imaging of one region of the subsurface but expressed in different time bases.

In order to be able to perform, in stage 3, joint inversion of the multi-time scale data sets, it is necessary to match the seismic events expressed in their own time base, that is as a function of the two-way traveltimes, denoted by $t_0$ and $t_1$, associated with the velocity models at dates D0 and D1. This matching procedure is translated into the estimation of a transformation law $t_1(t_0)$ (or $t_0(t_1)$) allowing warping the data expressed in the $t_0$ base so as to map the time domain $t_1$ (or $t_0$).

According to the invention, this seismic signal warping law is constrained by the use of a physical relation that is established in this paragraph. This relation establishes a link between the traveltimes and the velocities in the medium, then between the traveltimes and the impedances. It thus is a warping using a physical constraint, and not purely mathematical criteria (cross-correlation, resemblance tests between two seismic attributes, etc.).

Figure 1:
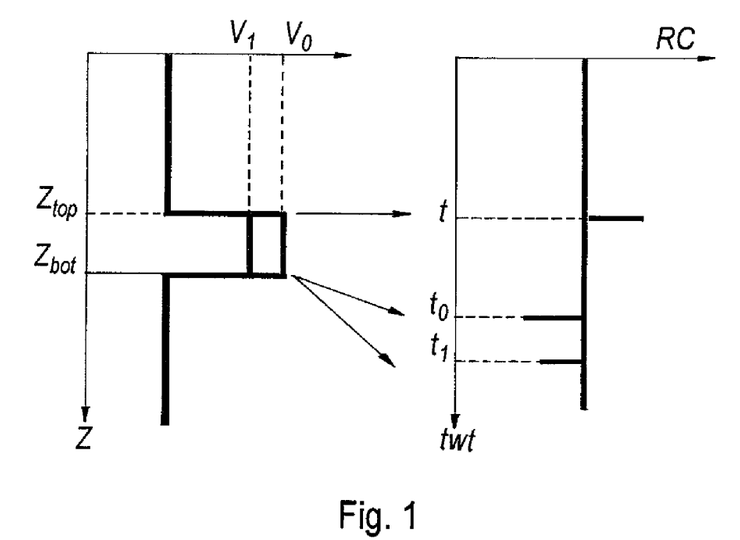
FIG. 1 illustrates the effects of a velocity variation (from V0 to V1) on the reflectivity distribution (RC) in a medium, measured as a function of the two-way propagation time TWT.

The diagram of FIG. 1 illustrates the effects of a velocity variation ($V_0$ to $V_1$) on the reflectivity distribution (RC) in a given medium as a function of the two-way propagation time (twt). Two velocity profiles $V_0$ (full line) and $V_1$ (dotted line) represented as a function of depth Z, corresponding to a velocity decrease in the reservoir, between dates D0 and D1, are shown on the left side of the diagram. The reservoir is located between depths $Z_{top}$ and $Z_{bot}$. This is translated, in the right figure showing the two reflectivity distributions expressed in two-way propagation time (associated with the velocity profiles on the left), into a shift of the reflection peaks characterizing the interface located just below the reservoir. The peak in the time base $t_0$ (full line) is shifted towards the bottom (compared to the position of this peak in the $t_1$ base) because velocity $V_1$ in the reservoir at date D1 is lower than velocity $V_0$ at date D0 (longer propagation time).

A depth-time conversion law can be associated with each one of these velocity profiles:

$$t_0(Z) = \int_0^Z \frac{1}{V_0(z)} dz \quad (1)$$

and $$t_1(Z) = \int_0^Z \frac{1}{V_1(z)} dz \quad (2)$$

For greater convenience, subscript 0 is used to refer to date D0 and subscript 1 for date D1. It can also be written:

$$\Leftrightarrow z(t_0) = \int V_0(t_0) dt_0 \Leftrightarrow dz = V_0(z(t_0)) dt_0 \quad (1)$$

and $$\Leftrightarrow z(t_1) = \int V_1(t_1) dt_1 \Leftrightarrow dz = V_1(z(t_1)) dt_1 \quad (2)$$

It follows therefrom that:

$$\frac{dt_1}{dt_0} = \frac{V_0(z(t_0))}{V_1(z(t_1))} \quad (3)$$

Equation (3) shows that the variations of t1 (as a function of t0) can be related to the velocity ratio at dates d) and d1. In fact, by calculating the derivative of $t_1(t_0)$ with respect to $t_0$, the following is obtained:

$$\frac{\partial t_1(t_0)}{\partial t_0} = \frac{\partial t_1(t_0)}{\partial z(t_0)} \frac{\partial z(t_0)}{\partial t_0}$$

$$= \frac{\partial t_1(t_0)}{\partial z(t_1)} \frac{\partial z(t_1)}{\partial z(t_0)} \times \frac{\partial z(t_0)}{\partial t_0}$$

$$= \frac{1}{V_1(t_1(t_0))} \times 1 \times V_0(t_0)$$

NB:

$$\frac{\partial z(t_1)}{\partial z(t_0)} = 1$$

because $z(t_1) = z(t_0)$ ($t_1$ and $t_0$ point towards the same depth z, see FIG. 1).

Consequently, the following differential equation (Equation E1) allows relation of the traveltime variations when the velocity in the medium changes:

$$\frac{\partial t_1(t_0)}{\partial t_0} = \frac{V_0(t_0)}{V_1(t_1(t_0))} \quad (E1)$$

By using Equation E1, a priori construction can be made of a transformation law $t_1(t_0)$ whose variation rate is related to the velocity ratios between the two media. Velocities $V_1(t_1)$ and $V_0(t_0)$ in the medium at dates D0 and D1 are however not explicitly known.

On the other hand, the stratigraphic inversion performed in stage 1 allows access to the impedances of the P and S waves and the medium density from the AVA data. Therefore, theoretically, the velocities could be deduced from these impedance and density models because the impedance is the product of the velocity by the density. The relationship is:

$$\frac{V_0}{V_1} = \frac{I_0}{I_1} \frac{\rho_1}{\rho_0}$$

In practice however, this result is unsatisfactory. In fact, the density model obtained from the multi-parameter elastic inversion of the AVA data is generally an ill-determined parameter, at least in comparison with impedance P, which is the best-determined parameter.

On the other hand, there is a simple relation between the velocity of the elastic waves (P or S) and the density, in most sedimentary rocks. See Gardner, G. H. F., Gardner, L. W., and Gregory, A. R., 1974, "Formation Velocity and Density—The Diagnostic Basics of Stratigraphic Traps", Geophysics, 39, 770-780. This relation is of the following type: $\rho \cong aV^b$ where a and b are constants depending on the rock type (or lithology). $b \approx \frac{1}{4}$ in most cases.

In the case of repeated seismic surveys, where a single midpoint (at depth z) is considered, but measured at two different dates (D0 and D1), if it is considered that the lithology does not vary at this point, the same coefficients a and b are for dates D0 and D1: $I_0 \cong aV_0^{1+b}$ and $I_1 \cong aV_1^{1+b}$. Equation E1 can therefore be rewritten as a function of impedances $I_1(t_1)$ and $I_0(t_0)$ (equation E2):

$$\frac{\partial t_1(t_0)}{\partial t_0} \cong \left(\frac{I_0(t_0)}{I_1(t_1(t_0))}\right)^{\frac{1}{1+b}} \quad (E2)$$

Since $b \approx \frac{1}{4}$, in the first approximation, consider that the exponent in equation E2 is of the order of 1. In this case substitute, in equation E1, the impedances obtained from the sequential inversions, $I_0$ and $I_1$, for velocities $V_0$ and $V_1$, thus leading to equation E3:

$$\frac{\partial t_1(t_0)}{\partial t_0} \approx \frac{I_0(t_0)}{I_1(t_1(t_0))} \tag{E3}$$

NB: the above approximation can also be found assuming that the density variations between dates d0 and d1 are negligible in comparison with the impedance variations, i.e. by putting $\rho_0 \cong \rho_1$ in equation E1.

Generalization of Equation E1 to Other Wave Types

In the case of homogeneous multi-component data (i.e. the incident and reflected waves remain of the same P or S type) such as, for example, PP-SS multi-component data, the PP and SS data are acquired at the same calendar date with the same acquisition geometry. Base 0 is the base of the PP data and base 1 is that of the SS data. Considering an isotropic medium, or normal-incidence paths in a VTI medium, the time base $t_{PP}$ of the PP data and the time base $t_{SS}$ of the SS data are connected by the following relation:

$$\int_z t_{SS} = \int_z \left(\frac{V_P}{V_S}\right) \times t_{PP}$$

It follows therefrom that:

$$\frac{\partial t_{SS}}{\partial t_{PP}} = \left(\frac{V_P}{V_S}\right).$$

In stage 1 of the method, stratigraphic inversion of the PP data allows having a good estimation of the P impedances and stratigraphic inversion of the SS data provides the best estimation of the S impedances. It is assumed that the two density models determined by either inversion are very close because density is a characteristic of the medium independent of the type of wave used for measuring it. It can thus be:

$$\frac{V_0}{V_1} \equiv \frac{V_P}{V_S} = \frac{I_{PP}}{I_{SS}}$$

Equation E1 becomes equation E4:

$$\frac{\partial t_{SS}(t_{PP})}{\partial t_{PP}} = \frac{I_{PP}(t_{PP})}{I_{SS}(t_{SS}(t_{PP}))} \tag{E4}$$

In the case of data with wave conversion such as, for example, PP-PS multi-component data, the PP and PS data (incident wave in P wave, reflected wave in S wave) are acquired at the same calendar date with the same acquisition geometry. The representation bases for the PP and PS data are the PP and PS times. The transformation law sought in this case is $t_{PS}(t_{PP})$. Now:

$$t_{PP} = 2 \times t_P$$

and $$t_{PS} = t_P + t_S = t_P\left(1 + \frac{V_P}{V_S}\right) = \frac{1}{2}t_{PP}\left(1 + \frac{V_P}{V_S}\right)$$

In stage 1, inversion of the PP data gives $I_{PP}(t_{PP})$ and inversion of the PS data allows a better estimation $I_S(t_{PS})$ than $I_S(t_{PP})$ obtained from the PP data, therefore in the PP time base. The ratio of the optimum model $I_{PP}(t_{PP})$ and of the optimum model $I_S(t_{PS})$ converted to PP time, that is $I_S(t_{PS}(t_{PP}))$, is a good approximation of the $V_P/V_S$ ratio in the medium.

$$t_{PS}(t_{PP}) = \frac{1}{2}t_{PP}\left(1 + \frac{V_P(t_{PP})}{V_S(t_{PS}(t_{PP}))}\right)$$

$$= \frac{1}{2}t_{PP}\left(1 + \frac{\rho(t_{PP})V_P(t_{PP})}{\rho(t_{PP})V_S(t_{PS}(t_{PP}))}\right)$$

$$= \frac{1}{2}t_{PP}\left(1 + \frac{I_{PP}(t_{PP})}{\rho(t_{PP})V_S(t_{PS}(t_{PP}))}\right)$$

It is considered that the density model obtained in the PP base from the PP data and the density model calculated from the PS data, scaled to PP times, are equivalent.

It follows therefrom that:

$$t_{PS}(t_{PP}) \approx \frac{1}{2}\left(1 + \frac{I_{PP}(t_{PP})}{\rho(t_{PS}(t_{PP}))V_S(t_{PS}(t_{PP}))}\right)t_{PS}(t_{PP}) = \frac{1}{2}t_{PP}\left(1 + \frac{I_P^{PP}(t_{PP})}{I_S^{PS}(t_{PS}(t_{PP}))}\right)$$

Thus equation E5 is obtained as follows:

$$\frac{\partial t_{PS}(t_{PP})}{\partial t_{PP}} = \left(1 + \frac{I_P^{PP}(t_{PP})}{I_S^{PS}(t_{PS}(t_{PP}))}\right) \tag{E5}$$

In general terms, a differential equation is defined relating, by a function F, the traveltime variations of a seismic wave $$\frac{\partial t_1(t_0)}{\partial t_0}$$

to the combinations of physical models (model $m_0$ for time scale $t_0$ and model $m_1$ for time scale $t_1$) resulting from the sequential inversions, such as $(I_P, I_S, \square)_{D0}$ and $(I_P, I_S, \square)_{D1}$ within the context of 4D seismic surveys:

$$\frac{\partial t_1(t_0)}{\partial t_0} = F(m_1, m_0)$$

Solution of Equation E3 and Calculation of the Time Shifts

In general terms, scale factor $t_1(t_0)$ is determined by solving the differential equation by means of a minimization method wherein the difference between $$\frac{\partial t_1(t_0)}{\partial t_0}$$

and function F is minimized. Thus $t_1(t_0)$ is sought that minimizes $$\left\| \frac{\partial t_1(t_0)}{\partial t_0} - F(m_1, m_0) \right\|^2.$$

In practice, to solve equation E3 (or all the other forms E2, E4, ... ), the method used is referred to as least-squares method. The function $t_1(t_0)$ is sought that minimizes the following cost function J:

$$J(t_1(t_0)) = \sum_\theta \left\| I_1^{Pseq}(t_1(t_0)) \frac{\partial t_1(t_0)}{\partial t_0} - I_0^{Pseq}(t_0) \right\|^2$$

The exponent "seq" indicates that this value comes from the sequential inversion (stage 1).

The problem to be solved here is strongly non linear. This non-linearity can be "decreased" starting from an initial model, $t_1(t_0)_{initial}$, not too far from the solution being sought, and by seeking low variations δt around this initial model: $t_1(t_0) = t_1(t_0)_{initial} + \delta t$.

An iterative method can be used to estimate δt by successive approximations such as the conjugate gradient method. This algorithm allows solving linear equation systems whose matrix is symmetrical and defined positive. It is based on the search of successive directions allowing reaching the exact solution of the system studied. The cost in computing time is much lower than in the case of the Newton method, which requires second derivative calculations. Using this method has many other advantages, among which its stability and the possibility of adding a regularization term, that is an a priori model $t_1(t_0)$, using an approach similar to the approach developed within the context of the stratigraphic inversion used in stage 1. It can thus be imposed that transformation law $t_1(t_0)$ should be correlated laterally, along the stratigraphic lines. The cost function can then have the following form:

$$J^*(t_1(t_0)) = J(t_1(t_0)) + \|(t_1(t_0) - t_1^{apriori}(t_0)\|_{C_M}^2$$

where $C_M$ is a covariance matrix similar to the matrix described in stage 1, describing the uncertainties on the a priori model $t_1(t_0)$.

Parametrization

To describe $t_1(t_0)$, $t_1(t_0)_{initial}$ and $\Box t(t_0)$, a representation on a limited number of base functions can be selected, for example "B-spline" functions, expressed in the reference time base $t_0$. This parametrization allows fast access to the derivatives of $t_1(t_0)$, $t_1(t_0)_{initial}$ and δt $(t_0)$.

Selection of Initial Law $t_1(t_0)$

The time shift (expressed in the reference base t0) at each point of the medium calculated trace by trace is denoted by Δt. Let Δt $\Delta t_1(t_0) - t_0$.

If it is assumed that the Δt remain low, which can be the case when studying repeated mono-component seismic surveys, but after a short production period: start is from a function $t_1(t_0)_{initial}$ equal to the identity function, that is $t_1(t_0)_{initial} = t_0$;

in the case of multi-component seismic surveys, or of repeated seismic surveys with sizeable time shifts, start can be from a linear interpolation of the two-way traveltimes picked along at least two geologic horizons for each set of seismic data to be subjected to joint inversion. These picked horizons, which represent the interpretation of geological reflectors from the events observed in the seismic survey (having a lateral continuity) and in wells, must intercept the zone of interest. It can be, for example, interfaces at the top and at the bottom of the reservoir.

It is also possible to construct an initial transformation of several segments of linear interpolation between matched horizon pairs ([$H_1(t_0)$, $H_1(t_1)$], [$H_2(t_0)$, $H_2(t_1)$]; [$H_3(t_0)$, $H_3(t_1)$]; ... ).

In the case of mono-component data (PP or SS), the following additional constraints can be added: (1) above the reservoir, Δt is zero, and (2) below the reservoir, Δt is equal to the time shift cumulated in the reservoir and measurable from the time pick of two horizons located below the reservoir. These constraints result from the fact that the velocity variations due to production are theoretically zero outside (above and below) the reservoir.

Figure 2:
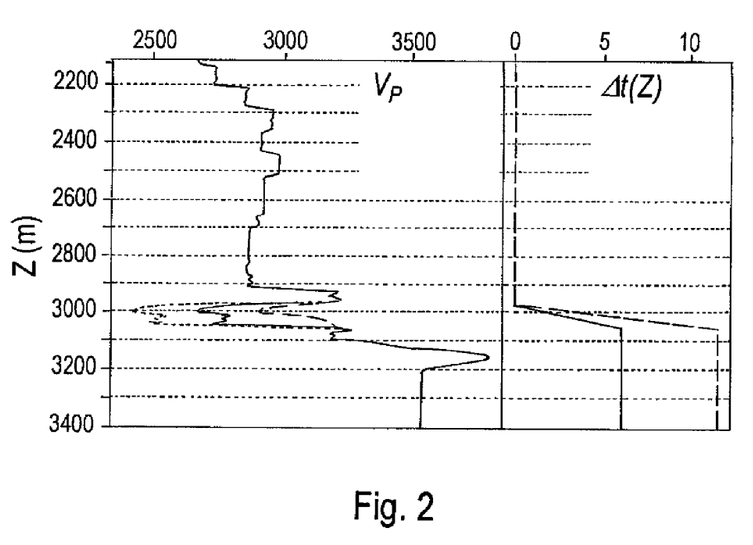
FIG. 2 shows, on the left, velocity models $V_P$ of P type seismic waves, at dates $T_0$ (thin dotted line), $T_1$ (full line) and $T_2$ (long dotted line) as a function of depth (vertical axis) and, on the right and shows the time shift as a function of depth (the model at date $T_0$ serves as the reference)
Figure 3:
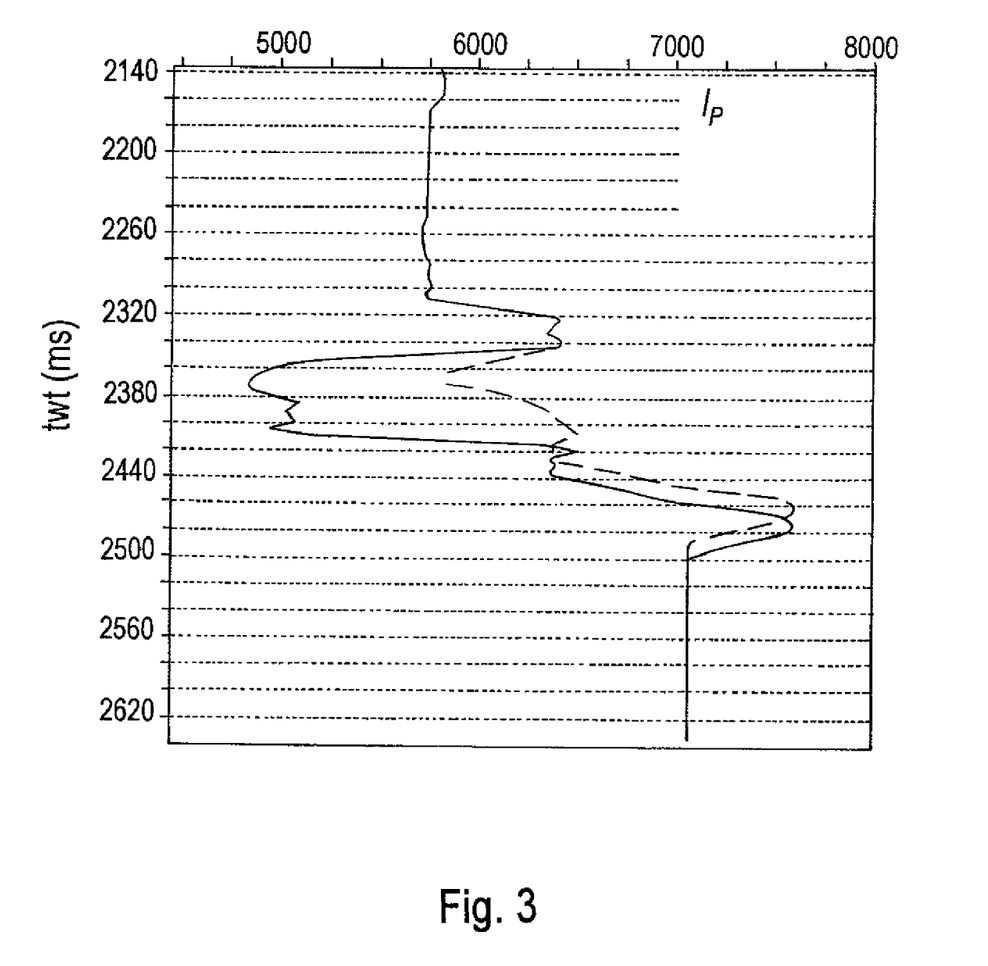
FIG. 3 illustrates impedance models P at dates $T_0$ (full line) and $T_2$ (dotted line) expressed on their specific time scales $t_0$ and $t_2$ (two-way propagation time of the P waves at dates $T_0$ and $T_2$)
Figure 4:
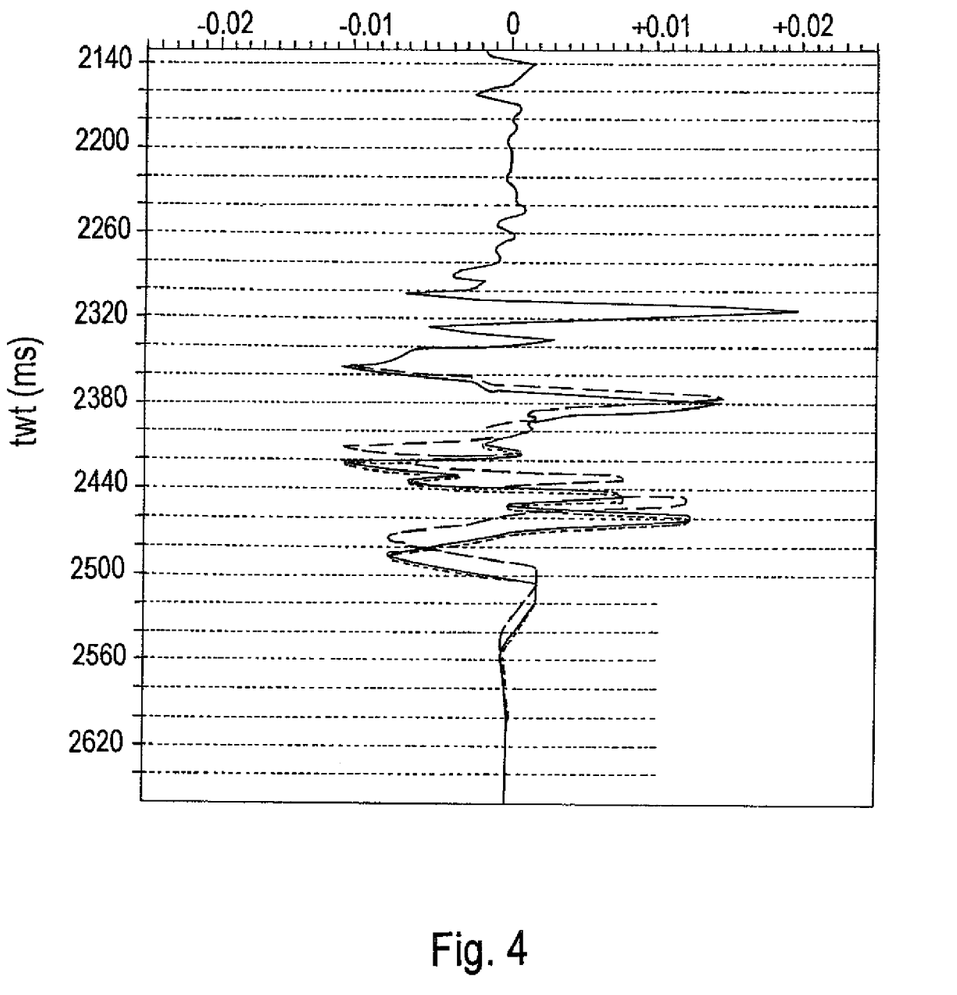
FIG. 4 shows synthetic 1D seismic traces corresponding to the impedance models of FIG. 3.

FIGS. 2, 3 and 4 show an example of application of this stage 2. FIG. 2 shows, on the left, velocity models $V_P$ of the P type seismic waves, at dates T0 (thin dotted line), $T_1$ (full line) and $T_2$ (long-dotted line), as a function of depth (vertical axis). The model at date $T_0$ comes from a real velocity log measured in a well, in a developed area. The model at date $T_1$ is obtained by uniformly decreasing by 10% the velocities measured at date $T_0$ in the entire reservoir. The model at date $T_2$ was obtained by uniformly increasing by 20% the velocities measured as a function of depth at date $T_0$, then by artificially modifying the log obtained in a non-uniform manner so as to obtain, after depth-time conversion, a greater time shift between the logs at dates $T_0$ and $T_2$, but varying in a non-linear manner (weakly non-linear) in the reservoir. FIG. 2 shows, on the right, the time shift (Δt(z)) as a function of depth (the model at date $T_0$ serves as the reference). For date $T_1$ (full line), a maximum shift is at the level of the bottom of the reservoir, of the order of 6 ms (in two-way time), that is hardly more than one sample (sampling interval: 4 ms). For date $T_2$ (long dotted line), the shift artificially constructed is of the order of 12 ms and it remains constant below the reservoir, that is beyond 2420 ms (in reference base $t_0$). This synthetic model was constructed so as to have a non-linear variation of the shifts in the reservoir (non-linear velocity variations).

As illustrated in FIG. 3, the impedance models P ($I_P$) is deduced as a function of time (twt) at the two extreme dates $T_0$ (reference) and $T_2$ (monitor). The P impedance models at dates $T_0$ (full line) and $T_2$ (dotted line) are expressed on their specific time scales $t_0$ and $t_2$ (two-way propagation time of the P waves at dates $T_0$ and $T_2$). They were obtained from the product of the velocity logs VP shown in FIG. 2 by the density log measured at date $T_0$, using the velocity logs to calculate the depth-time conversion laws, $t_0(z)$ and $t_2(z)$. A shift can be observed between the two-way propagation times of the P waves from 2340 ms, which corresponds to the top of the reservoir. This shift reaches 12 ms and remains constant below the reservoir, that is 2420 ms (in reference base t0). These synthetic models were constructed so as to have a non-linear variation of the shifts in the reservoir. These time-shifted impedance models with amplitude differences are used to apply stage 2 of the method and to estimate a scaling law $t_2(t_0)$, and consequently the time shifts $[t_2-t_0](t_0)$.

FIG. 4 compares the seismic survey corresponding to the model at date $T_2$ after scaling. It shows 1D synthetic seismic traces corresponding to the impedance models of FIG. 3: model at date $T_2$ expressed in its specific time scale $t_2$ (long dotted line), model at date $T_2$ expressed in time scale $t_0$ using the scaling method based on a physical constraint presented in the method (thin dotted line), model at date $T_2$ expressed in time scale $t_0$ using the exact law $t_2(t_0)$ (black full line). The seismic event matching technique presented in the method allows construction of a reliable transformation law $t_2(t_0)$ and to obtain a correct representation of the seismic data acquired at date $T_2$ on the time scale of reference date $T_0$ (the trace in thin dotted line is close to the trace in black full line).

Figure 5:
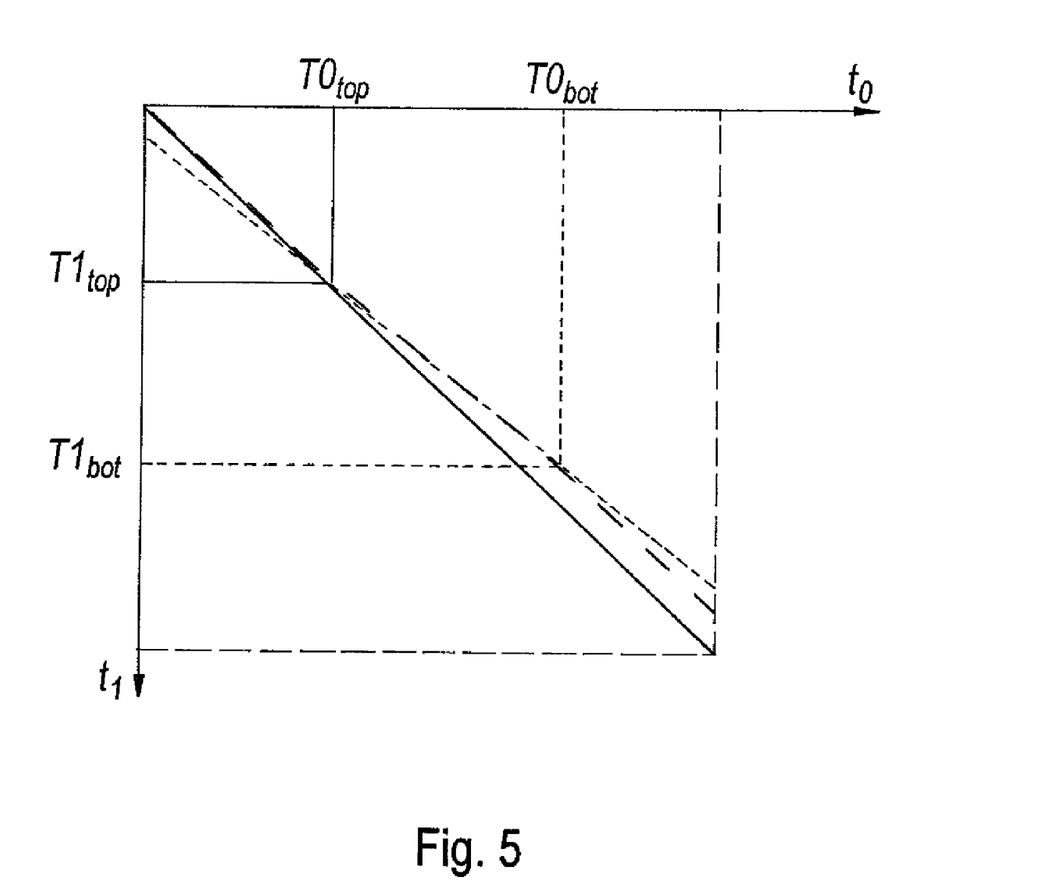
FIG. 5 shows various initial laws $t_1(t_0)$.

The initial law $t_2(t_0)$ used was constructed by means of a linear interpolation between the two-way times picked at the top and at the bottom of the reservoir on the "base" seismic survey and by assuming that, above the reservoir, $\Delta t$ is zero, and below it is equal to the cumulative time shift in the reservoir (i.e. 12 ms in this case). It is represented in FIG. 5 which also shows two other examples of 1D initial laws constructed to perform tests using:

1) Identity law $t_1=t_0$ (black full line);
2) a linear interpolation passing through $T_1$top ($T_0$top) and $T_1$bot ($T_0$bot) (thin dotted line); and
3) a linear interpolation passing through coordinate points $T_1$top ($T_0$top) and $T_1$bot ($T_0$bot) as above, but in addition the initial law is constrained to be equal to the Identity above the reservoir, and a constant shift is imposed below the reservoir (long dotted line).

It is a type 3 law that was used in the 1D tests presented in FIGS. 2, 3 and 4. Times $T_0$top, $T_0$bot, $T_1$top, $T_1$bot respectively correspond to the times measured on the seismic records at dates $T_0$ (time scale $t_0$) and $T_1$ (time scale $t_1$), and corresponding to the reflections at the top (top) and at the bottom (bot) of the reservoir.

3—Joint inversion

Joint inversion of several sets of seismic data expressed in different time scales allows:

in the case of a repeated mono-component (PP) seismic survey, to improve the estimation of the seismic attribute variations linked with the production parameters. This third stage of the method leads to the construction of two optimum models $(I_P, I_S, \rho)_{D0}$ and $(I_P, I_S, \rho)_{D1}$ that can be similar or different in each stratigraphic unit depending on whether it is a zone affected or not by the reservoir development. These models are compatible with the amplitude variations observed between the two measuring surveys and with transformation law $t_1(t_0)$ allowing representation of the models in one or the other of the time bases $t_0$ and $t_1$ of the data, in the case of a multi-component seismic survey with or without wave conversion (PP-SS, PP-PS, . . . ): this third stage allows construction of a single optimum model $(I_P, I_S, \rho)$ compatible with all of the available seismic data, and thus improving characterization of the elastic parameters of the reservoir. Simultaneous inversion of the information contained in the multi-component seismic data allows reducing the number of possible solutions and to construct more realistic models. In particular, the information contained in the S waves and the converted waves (SS, PS, . . . ) allow improvement of the S impedance and density models.

More precisely, in the particular case of 4D mono-component seismic surveys, the method allows construction of two distinct subsoil models $m_{D0}$ and $m_{D1}$ corresponding to the two data sets measured at dates D0 (base) and D1 (monitor) respectively, by minimizing the following cost function:

$$J(m_{D0}, m_{D1}) = \sum_\theta \left\| \begin{array}{c} d_\theta^{synt}(m_{D0}(t_0)) - \\ d_\theta^{obs}(t_0) \end{array} \right\|_{C_D^{-1}}^2 + \sum_\theta \left\| \begin{array}{c} d_\theta^{synt}(m_{D1}(t_{D1}(t_0))) - \\ d_\theta^{obs}(t_1) \end{array} \right\|_{C_D^{-1}}^2 +$$

$$\|m_{D0}(t_0) - m_{D0}^{prior}(t_0)\|_{C_M^{-1}}^2 + \|m_{D1}(t_1) - m_{D0}^{prior}(t_{D1}(t_0))\|_{C_M^{-1}}^2$$

The relationship $m_{D0}^{prior} = m_{D1}^{prior}$ is chosen because the two models that are sought have the same low-frequency component, a part which, as may be recalled, is not updated by the inversion. In fact, inversion allows updating the models only in the passband of the seismic data.

Furthermore, updating the models can be done in each stratigraphic unit making up the model by using:

either all the seismic data available if the models are to be identical in this unit, or the data available in the "base" or the "monitor" only. In this case, the two models can be different in this unit.

This weighting is achieved upon calculation of the gradient of the cost function, used for seeking the minimum.

At the first iteration, $m_{D0}(t0) = m_{D0}^{prior}$ and $m_{D1}(t1) = m_{D1}^{prior}$. The models are then updated in the time base referred to as reference base $t_0$ (associated with date $D_0$). Before each update, reciprocal transformation $t_0(t_1)$ (that can be readily deduced from $t_1(t_0)$) is thus used to express the current model $m_{D1}$ (t1) in base t0 (see FIG. 6). It is then possible to calculate the synthetic seismic data associated with the models in each base specific to the data. They can thereafter be compared with the seismic data measured at each date $D_0$ and $D_1$.

The Invention Thus Affords Many Advantages:

the well-seismic calibrations and the sequential inversions of stage 1 are a good preprocessing operator for the 4D seismic data allowing increasing the signal-to-noise ratio (better locate the 4D information), and thus to calculate more robust and reliable seismic attributes ($I_P$ for example) for stage 2 of the method, in stage 2, a physical relation existing between the impedance (therefore velocity) variations and the wave propagation time variations in the medium explored is used. This allows guaranteeing a physical origin for the estimated time shifts. Most other seismic event matching techniques use seismic traces directly and mathematical cross-correlation tools, and the physical origin of the time shifts is not exploited;

a geological constraint can be introduced in the objective function linked with stage 2, the calculation of $t_1(t_0)$, in order to improve the estimation of the transformation laws;

in stage 3 of the method, the seismic data remain in their own base and undergo no warping before or after joint inversion. The seismic modelling based on a 1D convolution using the wavelets determined beforehand in the well-seismic calibration phase included in stage 1 thus remains valid;

the time shifts can be estimated from the impedances for several configurations (PP (or SS) data spaced out in time, PP and PS data, PP and SS data, . . . ) with a very limited number of hypotheses on the relations existing between the parameters of these models. The main hypothesis relates to the Gardner law connecting the velocity to the density, whose validity is quite widely verified in sedimentary rocks; and there are few hypotheses on the nature of the 4D variations of the physical properties of the subsoil.

The method according to the invention can be used to analyze seismic data obtained from repeated seismic experiments (4D seismic surveys) carried out within the context of studies on the evolution of the distribution of the fluids present in the subsoil, in form of one or more reservoirs. These reservoirs can contain hydrocarbons, fluids of natural origin (natural gas, underwater, . . . ), fluids deliberately injected into the ground (for $CO_2$ or natural gas storage, or to improve the recovery ratios in producing wells, etc.). The invention allows obtaining a reliable estimation of seismic attributes such as the elastic impedance variations in the subsoil, which can subsequently be used within the context of petroleum exploration, for example, as constraints in the construction and update of the geological reservoir model, because very important dynamic information can be extracted from 4D seismic surveys, which can notably allow to detect preferential migratory channels, trapping zones, drainage or sealing defects in the reservoir. This information is determining for establishing optimum field development schemes. Besides, integration of these seismic constraints has reached a high degree of concern in the petroleum industry. The method thus allows, within the petroleum industry, quantitatively estimating physical property changes in the subsoil by interpreting the amplitude and propagation time changes of the seismic waves reflected at the various geological interfaces present in the subsoil, measurable at the surface in seismic reflection experiments.

The method can also be applied within the context of volcano monitoring, the reservoir being then the magma chamber containing gases and lava. In fact, the physical properties of fluids of volcanic origin can evolve in the course of time, for various reasons (pressure, temperature, partial saturation change, etc.). If the elastic property changes are sufficiently great, they can be detected by recording the amplitudes of the seismic waves reflected on the magma chamber-overburden interfaces, at least at two different dates.

Besides, the method according to the invention can be used to interpret the multi-component seismic data acquired within the context of a (2D or 3D) seismic exploration survey, the joint interpretation of different types of measured seismic data allowing characterization of the reservoirs or, more generally, of the subsoil to be improved.

The invention claimed is:

1. A method of computer implemented constructing an image representative of a heterogeneous medium by joint inversion of seismic data expressed in a first time scale $t_0$ and a second time scale $t_1$, comprising:
    carrying out sequential inversion of the seismic data in order to determine a first estimation of at least one combination of physical quantities from the seismic data expressed in the first time scale and at least a second estimation of the at least one combination from the seismic data expressed in the second time scale;
    defining a scale factor allowing synthetic data described in the first time scale $t_0$ to be expressed in the second time scale $t_1$, by a differential equation relating, by a function, traveltime variations of a seismic wave $$\frac{\partial t_1(t_0)}{\partial t_0}$$

to the combinations of physical quantities, and by determining the scale factor by solving the differential equation by a minimization method wherein the difference between $$\frac{\partial t_1(t_0)}{\partial t_0}$$

and the function is minimized; and
    constructing the image representative of a heterogeneous medium by carrying out the joint inversion wherein a cost function using the scale factor is minimized to evaluate a difference between synthetic data expressed in the first time scale and the seismic data expressed in the second time scale.

2. A method as claimed in claim 1, wherein the at least one combination of physical quantities represents impedances.

3. A method as claimed in claim 2, wherein the impedances are impedances relative to S waves.

4. A method as claimed in claim 3, wherein estimation of at least one combination of physical quantities comprises using a multi-component inversion.

5. A method as claimed in claim 4, wherein the inversion is a stratigraphic inversion comprising using a priori information including in-situ measured data.

6. A method as claimed in claim 2, wherein the impedances are impedances relative to P waves.

7. A method as claimed in claim 6, wherein estimation of the at least one combination of physical quantities comprises using a mono-component inversion.

8. A method as claimed in claim 7, wherein the inversion is a stratigraphic inversion comprising using a priori information including in-situ measured data.

9. A method as claimed in claim 1, wherein the data expressed in the first and second time scales are data resulting from wave emissions in the medium.

10. A method as claimed in claim 9, wherein waves emitted in the medium are elastic or electromagnetic waves.

11. A method as claimed in claim 1, wherein the data are prestack multi-component seismic data.

12. A method as claimed in claim 1, wherein one of the time scales represents a scale of arrival times of non-converted P waves.

13. A method as claimed in claim 1, wherein one of the time scales represents a scale of arrival times of converted P waves.

14. A method as claimed in claim 1, wherein one of the time scales represents a scale of arrival times of the non-converted S waves.

15. A method as claimed in claim 1, wherein one of the time scales represents a scale of arrival times of converted S waves.

* * * * *